United States Patent [19]

Mozdzen et al.

[11] Patent Number: 5,537,656
[45] Date of Patent: Jul. 16, 1996

[54] METHOD AND APPARATUS FOR A MICROPROCESSOR TO ENTER AND EXIT A REDUCED POWER CONSUMPTION STATE

[75] Inventors: Thomas J. Mozdzen, Gilbert; Larry E. Mosley, Phoenix, both of Ariz.

[73] Assignee: Intel Corporation, Santa Clara, Calif.

[21] Appl. No.: 261,456

[22] Filed: Jun. 17, 1994

[51] Int. Cl.⁶ .................................................. G06F 13/00
[52] U.S. Cl. ................................... 395/750; 395/375
[58] Field of Search .................................... 395/750, 375

[56] References Cited

U.S. PATENT DOCUMENTS

| | | | |
|---|---|---|---|
| 4,736,119 | 4/1988 | Chen et al. | 307/269 |
| 4,875,160 | 10/1989 | Brown, III | 364/200 |
| 5,226,130 | 7/1993 | Favor et al. | 395/375 |
| 5,339,437 | 8/1994 | Yuen | 395/700 |
| 5,369,771 | 11/1994 | Gettel | 395/750 |

*Primary Examiner*—Jack B. Harvey
*Assistant Examiner*—John Travis
*Attorney, Agent, or Firm*—Blakely, Sokoloff, Taylor & Zafman

[57] ABSTRACT

A method and apparatus for placing a microprocessor in and out of a reduced power consumption state utilizing system interrupts in a computer system. The method of the present invention intercepts instructions being executed by the processor before placing the processor in a reduced power consumption state. On a request for the processor to exit the reduced power consumption state, the method of the present inventions allows the processor to execute pre-determined resume instructions to wait out any voltage level fluctuations in the processor as it exits the reduced power consumption state, before allowing the processor to continue execution of the instructions intercepted prior to placing the processor in the reduced power consumption state.

20 Claims, 7 Drawing Sheets

METHOD AND APPARATUS FOR A MICROPROCESSOR TO ENTER AND EXIT A REDUCED POWER CONSUMPTION STATE

BACKGROUND OF THE INVENTION

1. Field of the Invention

The present invention generally relates to the field of computer systems. More specifically, the present invention relates to features incorporated within a microprocessor that enable the microprocessor to enter and exit a reduced power consumption state during a System Management Mode operation.

2. Background of Related Art

Recent implementations of microprocessors have a System Management Mode (SMM) for supporting advanced power-reduction strategies in these microprocessors. SMM is a state in which the microprocessor is able to manage various components in the computer system, such as memory and other peripheral devices, and control the availability of these resources, in order to reduce power consumption in the computer system.

The microprocessor enters the system management mode upon being triggered by a system interrupt in the computer system, to cause the microprocessor to power down to enter the reduced power consumption state. The system interrupt comprises the assertion of electrical signals to the microprocessor. When in the reduced power consumption state, the functions of the microprocessor are limited since the microprocessor cannot operate at normal operating levels.

The microprocessor exits the reduced power consumption state on being triggered once again by an SMM exit interrupt. When the microprocessor exits the reduced power consumption state, the microprocessor continues executing instructions that were in the microprocessor's instruction pipelines prior to entering the reduced power consumption state.

Although the microprocessor is able to continue executing instructions in its instruction pipelines after exiting the reduced power consumption state, the transition to and from the reduced power consumption state can have an effect on the integrity of the instructions executed immediately after the microprocessor exits the reduced power consumption state.

When the microprocessor enters the reduced power consumption state, the current ($I_{cc}$) levels in the processor drop as parts of the processor are powered down. When the processor is interrupted to exit the reduced power consumption state, there is a sudden change in the current levels in the processor as all parts of the processor are powered up and the current levels return to normal operating levels. For example, the current activity in the processor as it emerges from a reduced power consumption state may jump up to about four times the average current levels in a very short period of time, such as 10 ns for a 100 MHZ clock frequency.

The sudden rise in the current level as the processor emerges from the reduced power consumption state cause voltage fluctuations in the processor, which causes the voltage levels to exceed specifications and affect the performance of the processor. The voltage fluctuations in the processor are highest as the processor emerges from the reduced power consumption state. However, the voltage fluctuations dampen over time after the processor has completely exited the reduced power consumption state.

In the prior art, the processor continues to execute user instructions as soon as it is interrupted to exit the reduced power consumption state. The continued execution of instructions by the processor as it emerges from the reduced power consumption state often leads to the degradation in the integrity of the instructions being executed, as a result of the voltage fluctuations in the processor.

The degradation is due to the fact that the first few voltage fluctuations can cause the processor to run slower, which could result in timing failures during execution, which therefore hampers the processor's performance. Thus, a method of enabling a processor to enter and exit a reduced power consumption state without affecting instructions being executed in the processor is needed.

The present invention provides a method and apparatus for transitioning a processor in and out of a reduced power consumption state, such that the integrity of instructions being executed in the processor prior to entering the reduced power consumption state is maintained.

SUMMARY AND OF THE INVENTION

A method and apparatus for enabling a microprocessor to enter and exit a reduced power consumption state is described. The described embodiment includes a shutdown instruction and a resume instruction. The shutdown instruction includes a shutdown routine which the processor executes when entering the reduced power consumption state. The resume instruction includes a resume routine that the processor executes when exiting the reduced power consumption state.

The described embodiment also includes a mechanism for intercepting instructions executing in the processor's instruction pipeline before the processor enters the reduced power consumption state. The intercepted instruction is stored in the processor while the processor is in the reduced power consumption state. The stored instruction is eventually restored in the processor after the processor has exited the reduced power consumption state.

The disclosed embodiment further includes flushing the processor's instruction pipeline prior to the processor entering the reduced power consumption state.

Advantages of the present invention include the flushing of the processor's instruction pipeline so that as the processor emerges from the reduced power consumption state, only non-critical instructions are will be executed as voltage fluctuates in the processor. Thus, the integrity of instructions executed after the processor exits the reduced power consumption state is maintained.

The execution of the resume instruction enables the processor to wait out voltage fluctuation in the processor, as a result of the sudden rise in the current levels in the processor as the processor powers up all its parts. The wait out of the voltage fluctuation in the processor enables the processor to begin executing critical instructions after the voltage fluctuation have substantially subsided. Thus, the processor's performance is not impacted by the entry and exit of the reduced power consumption state.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION

A method and apparatus for reducing power consumption in a processor is described. In the following description, numerous specific details are set forth, such as specific numbers of signals and gates in order to provide a thorough understanding of the present invention. It will be apparent, however, to one skilled in the art that the present invention may be practiced without these specific details. In other instances, well-known computer operations and components have been shown in block diagram form, rather than in detail, in order to avoid obscuring the present invention.

Figure 1:
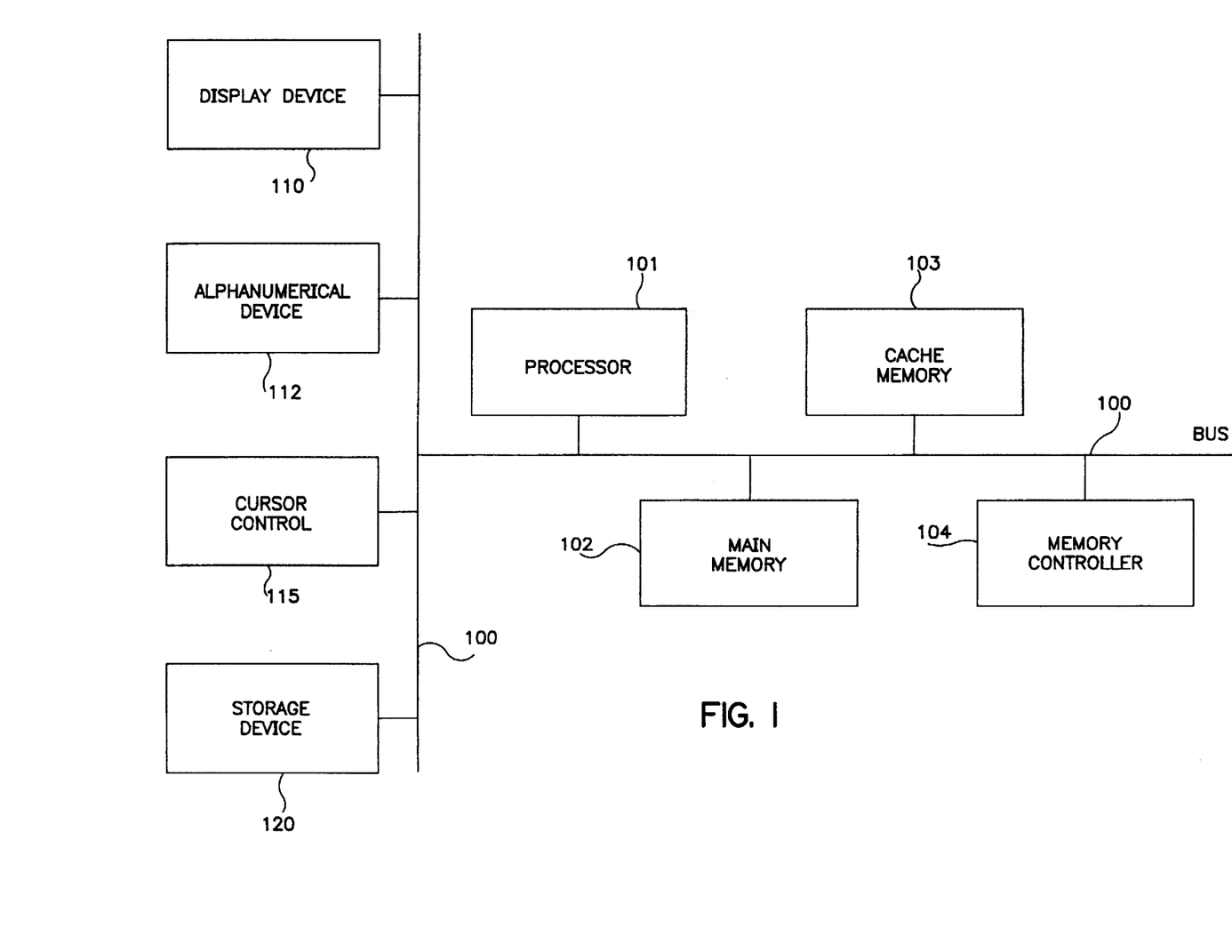
FIG. 1 is a block diagram of a computer system of the present invention.

As illustrated in FIG. 1, a computer system of the present invention generally comprises a bus 100 for communicating information, a processor 101 coupled to the bus 100 for processing instructions, and a main memory 102 coupled to the bus 100 for storing data and instructions for the processor 101. A cache memory 103 is shown coupled to the bus 100 for temporarily storing frequently accessed instructions for the processor 101. Data is retrieved from the main memory 102 for the processor 101 and stored in the cache memory 103. Memory controller 104 is also shown coupled to the bus 100 for controlling access to the main memory 102 and the cache memory 103.

The computer system also includes a display device 110 such as a cathode ray tube or liquid crystal display coupled to the bus 100 for displaying information to the computer user, an alphanumeric input device 112 including alphanumeric and other keys coupled to the bus 100 for communicating information and command selections to the processor 101 and a cursor control device 115 coupled to the bus 100 for cursor movement. Moreover, the system includes a secondary storage device 120, such as a magnetic drive, for storing data in the computer system.

Certain implementations and uses of the computer system of the present invention may not require nor include all of the above components. For example, in certain implementations, a keyboard and cursor control device for entering information into the system may not be required. In other implementations, it may not be required to provide a display device.

Figure 2:
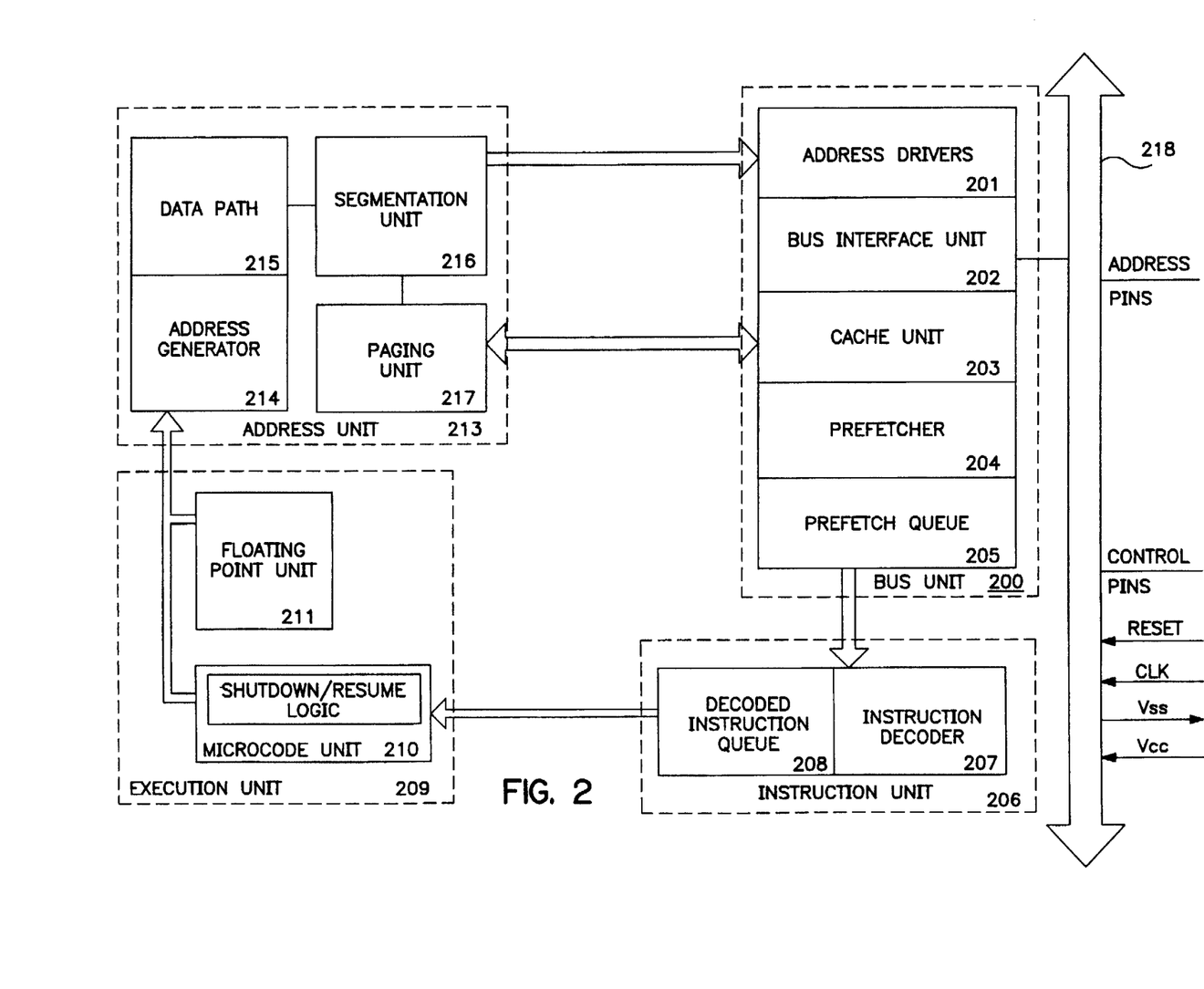
FIG. 2 is a block diagram of the currently preferred embodiment of the microprocessor of the present invention.

FIG. 2 is a block diagram of the processor 101 utilized by the preferred embodiment of the present invention. Processor 101 is preferably manufactured as an integrated circuit using a metal-oxide-semiconductor (MOS) process. Referring to FIG. 2, processor 101 generally comprises a bus unit 200, an instruction unit 206, an execution unit 209, and an address unit 213. The bus unit 200 performs all bus operations for the processor 101, generating address, data, and command signals required to access other peripheral devices in the computer system.

The bus unit 200 comprises an address driver 201, a bus interface unit (BIU) 202, a cache unit 203, prefetch buffers 204, and prefetch queue 205. A Bus interface 218 is coupled to the BIU 202 to provide pin interface for control, address and data signals between processor 101, and the remainder of the computer system. The BIU 202 includes the bus controller and provides the necessary interface between the internal buses of processor 101, and in particular prefetch buffers 204 and the external buses responsible for fetching data from the external data memory system. In the currently preferred embodiment, the present invention uses an external 32-bit address bus and a 32-bit data bus. The BIU 202 is also coupled to write buffers (not shown) which provide a buffer storage area for data which is to be transferred from processor 101 to the remainder of the computer system.

When not performing other bus duties, the bus unit 200 "looks ahead" and prefetches instructions from memory. When prefetching, the bus unit 200 assumes that program execution proceeds sequentially; that is, the next instruction follows the preceding one in memory. When the prefetcher reaches the limit of the program segment, it stops prefetching instructions. If a program transfer causes execution to continue from a new program location, the bus unit 200 resets the prefetch queue 205 and immediately begins fetching instructions from the new program location.

The instruction unit 206 is coupled to the bus unit 200 to receive instructions from the prefetch queue 205, decode them, and place the decoded instructions in the decoded instruction queue for use by the execution unit 209. The instruction unit 206 comprises an instruction decoder 207 and a decoded instruction queue 208. The instruction decoder 207 is coupled to receive the instructions from prefetch buffers 204 and sends the decoded instructions, in the form of microcode, to datapath 215 in the address unit 213 for execution. The instruction unit 206 also comprises an instruction pointer register (not shown) and a prior instruction pointer register (not shown) for holding the current and prior instructions respectively. The instruction pointer controls instruction fetching in the instruction unit 206.

Decoded instructions from the instruction unit 206 are fetched by the execution unit 209, which comprises a microcode unit 210 and a floating point unit 211, and executed. The microcode unit 210 contains a memory (CROM) which stores the microcoded instructions (microcode) for the processor 101. The microcode unit 210 provides an address generator 214 with address information, which the address generator 214 uses to generate addresses corresponding to data necessary in the execution of the decoded instructions. The microcode unit 210 is also responsible for instruction boundary processing, such as interrupt/ exception arbitration, and halting the instruction decoder 207 when necessary. The microcode unit 210 is also responsible for handling most of the freeze conditions, such as cache memory miss, etc. In the preferred embodiment, the microcode unit 210 also comprises logic for executing a plurality of instructions. The instructions comprise a "shutdown" instruction for stopping the processor 101, transitioning the processor 101 to a reduced power consumption state, and preventing the processor from executing instructions until it is restarted, and a "resume" instruction which transitions the processor out of the reduced power consumption state and enables the processor to restart instructions executions. The shutdown and resume instructions are described in more detail in FIG. 6 and FIG. 7 respectively.

The address unit 213 comprises an address generator 214, datapath 215, a segmentation unit 216, and a paging unit 217. The segmentation unit 216 provides the memory management and protection services for the processor 101 by providing easy data and code relocatability and efficient sharing of global resources in the processor 101. Segmentation unit 216 is coupled to the cache unit 203 via address drivers 201 to provide a linear address to the cache unit 203 when paging has been disabled by the processor 101. When paging is enabled by the processor 101, the paging unit 217 provides a physical address translation to the cache unit 203.

The shutdown instruction and the resume instruction may also be stored in other places, such as the system BIOS, in the operating system of the computer system, etc., and not necessarily in the processor 101.

Figure 3:
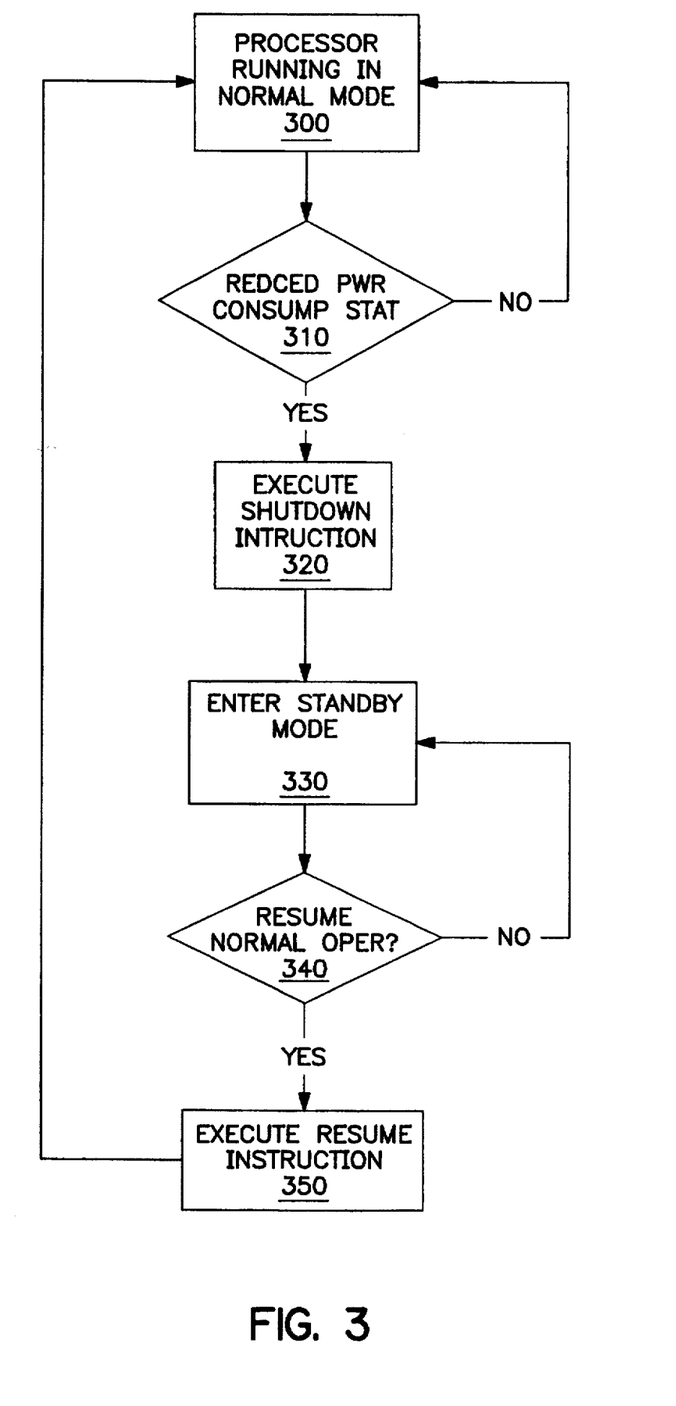
FIG. 3 is a flow chart of the operation of the prior art.

The overall function of the preferred embodiment operate according to the flow chart illustrated in FIG. 3. As shown in FIG. 3, at processing step 300 operation begin when the processor 101 is running in normal operating mode.

At processing step 310, a determination is made whether there is a first SMM interrupt to the processor 101 to cause the processor 101 to enter a reduced power consumption state. The first SMM interrupt is an external event which is invoked by the assertion of electrical signals to the external pins of the processor 101. If the first SMM interrupt is asserted to the processor 101, processing continues at processing step 320; otherwise, the processor 101 continues operating in normal mode.

At processing step 320, the processor 101 executes the shutdown routine upon detecting the first SMM interrupt requesting the processor 101 to enter the reduced power consumption state. The processor enters the reduced power consumption state at processing step 330 after the shutdown instruction has been executed. Processing step 320 is described in more detail in FIG. 6.

At processing step 330, the processor 101 is in a reduced power consumption state. The current level in the processor 101 during the reduced power consumption state is low due to the processor 101 powering down most of its parts as the processor enters the reduced power consumption state. As a result of the powering down the processor's 101 parts, processing functions in the processor 101 is substantially reduced.

At processing step 340, a determination is made to check whether the processor 101 should resume normal operations (i.e., exit the reduced power consumption state). If a second SMM interrupt is detected by the processor while in the reduced power consumption state, processing continues to processing step 350; otherwise, processing remains at processing step 330 where the processor 101 continues to remain in a reduced power consumption state to wait for an SMM interrupt to exit the reduced power consumption state.

At processing step 350, a second SMM interrupt from the computer system causes the processor 101 to exit the reduced power consumption state. The second SMM interrupt is asserted when resources controlled by the processor 101 are needed by the computer system. Once the second SMM interrupt is asserted at the processor's 101 external pins, the processor 101 starts executing the resume instruction. The resume instruction is executed by the processor 101 for a period of about two clock cycles, to wait out voltage fluctuation in the processor 101 as it emerges from the reduced power consumption state.

Figure 4:
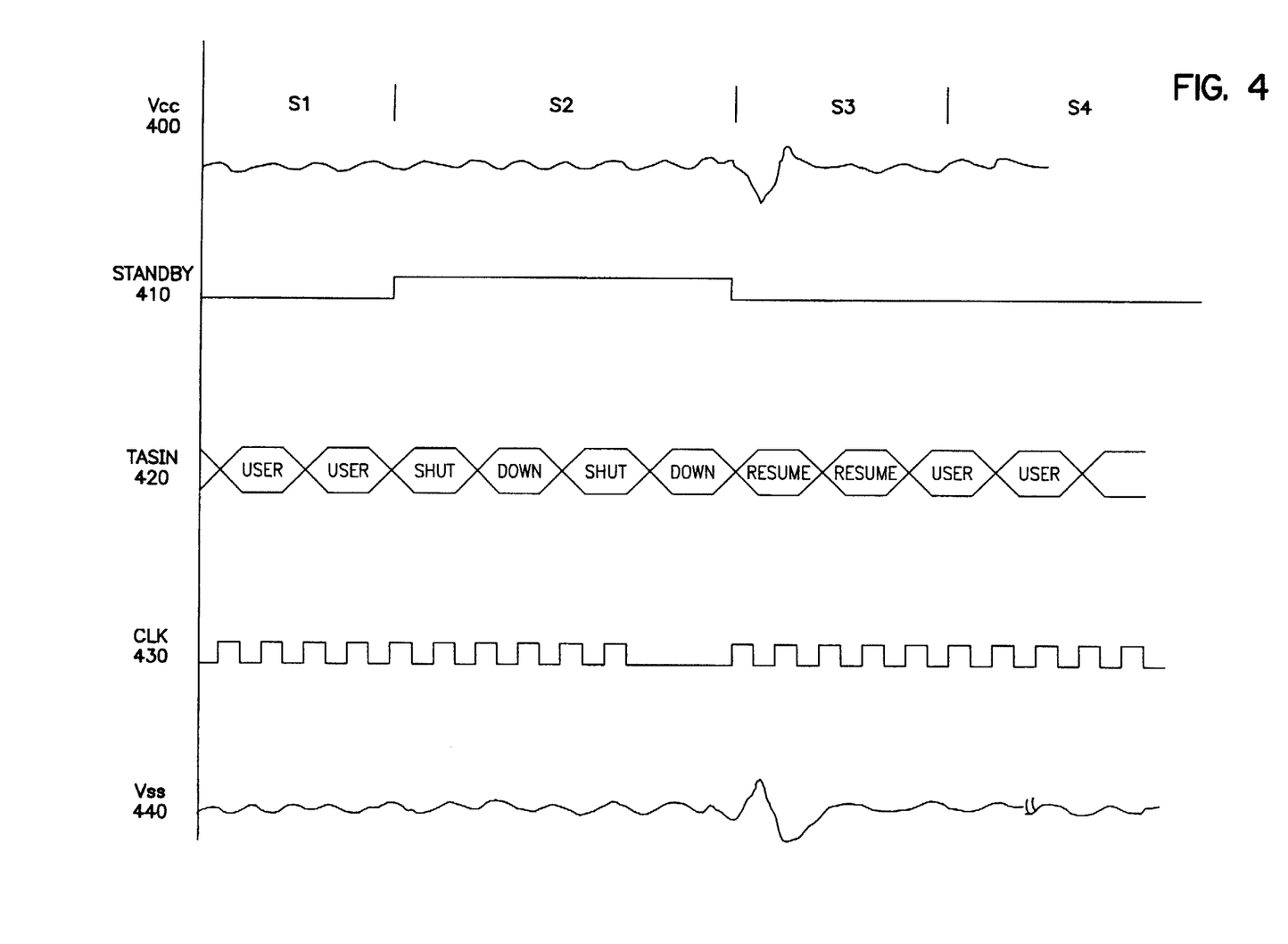
FIG. 4 is a waveform diagram of the operation of the currently preferred embodiment of the present invention.

FIG. 4 is a waveform diagram that illustrates the operation of the microprocessor of one embodiment of the preferred embodiment of the present invention. FIG. 4 shows the power supply signal ($V_{cc}$) 400 of the processor 101, the is standby signal 410, which is asserted when the processor 101 enters the reduced power consumption state, the instructions 420 executed by the processor 101, the internal clock signal 430 of the processor 101, and the ground signal ($V_{ss}$) 440 of the processor 101.

The $V_{cc}$ 400 signal shows current level in the processor 101. During the processor 101's normal operating mode, there is very little voltage fluctuations and thus the $V_{cc}$ signal 400 is normal.

The standby signal 410 is deasserted when the processor is operating normally. However, as soon as the second SMM interrupt is asserted to cause the processor 101 to enter the reduced power consumption state, the processor 101 asserts the standby signal 410 high. The standby signal 410 stays high during the time that the processor 101 is in a reduced power consumption state. The standby signal 410 is deasserted low when the processor 101 is interrupted to exit the reduced power consumption state.

The instructions 420 shown in FIG. 4 include the user instructions being executed by the processor 101 prior to entering the reduced power consumption state, the shutdown instructions that places the processor 101 in the reduced power consumption state, and the resume instructions which the processor 101 executes when emerging out of the reduced power consumption state. The instructions also includes instructions restored to the processor 101 after it emerges out of the reduced power consumption state.

Still referring to FIG. 4, at state S1, the processor 101 is in a normal operating state. The $V_{cc}$ signal 400 and the Vss 440 signal are level, an indication that the current level in the processor 101 is normal. The processor 101 continues to execute instructions in its instruction pipeline. The standby signal 410 is also deasserted in state S1.

At state S2, the processor 101 upon detecting an SMM interrupt to enter the reduced power consumption state asserts the standby signal 410. When the standby signal 410 is asserted, the instructions in the processor 101 instruction pipeline are intercepted and stored in the processor's 101 instruction unit. The processor's 101 instruction pipeline is then flushed of any instructions. The processor 101 then begins to execute the shutdown instruction routines to enter the reduced power consumption state.

In the reduced power consumption state, the current level in the processor 101 is reduced from normal operating level. For example, the processor 101 will draw current in the range of 100 uA in comparison with the 10.0 A that current in an order of magnitude up to processor 101 draws at normal operating level. The internal clock 430 also stops running when the processor 101 is in the reduced power consumption state.

At state S3, the processor 101 upon detecting the second SMM interrupt to exit the reduced power consumption state, deasserts the standby signal 410. The deassertion of the standby signal 410 causes the processor 101 to begin executing the resume instructions. The execution of the resume instruction routines causes the processor 101 to begin powering up parts that were powered down during the reduced power consumption state (e.g., the clock). The powering up of the processor 101 parts causes the current level in the processor 101 to start rising.

As the processor 101 emerges from the reduced power consumption state, the $V_{cc}$ signal 400 droops down and the $V_{ss}$ signal 440 spikes up. The drooping down and spiking up of the $V_{cc}$ signal 400 and the $V_{ss}$ signal 440 cause the voltage levels in the processor 101 to fluctuate.

The processor 101 continues to execute the resume instruction to wait out the voltage fluctuations. In the currently preferred embodiment, the resume instruction is executed for two clock cycles at which point the voltage fluctuations in the processor 101 is reduced and the current level in the processor 101 returns to normal. The instructions intercepted prior to the processor 101 entering the reduced power consumption state are restored into the processor's instruction pipeline and the processor 101 continues execution of the instructions at state S4.

At state S4, the current level in the processor 101 is normal and the voltage fluctuations in the processor 101 have substantially subsided. The processor 101 continues to execute user instructions from the same point prior to the instruction being intercepted.

In the preferred embodiment, when the processor 101 exits the reduced power consumption state, the current level rises from the reduced level of about 100 uA to normal level of about an order of magnitude up to 10.0 A.

Figure 5:
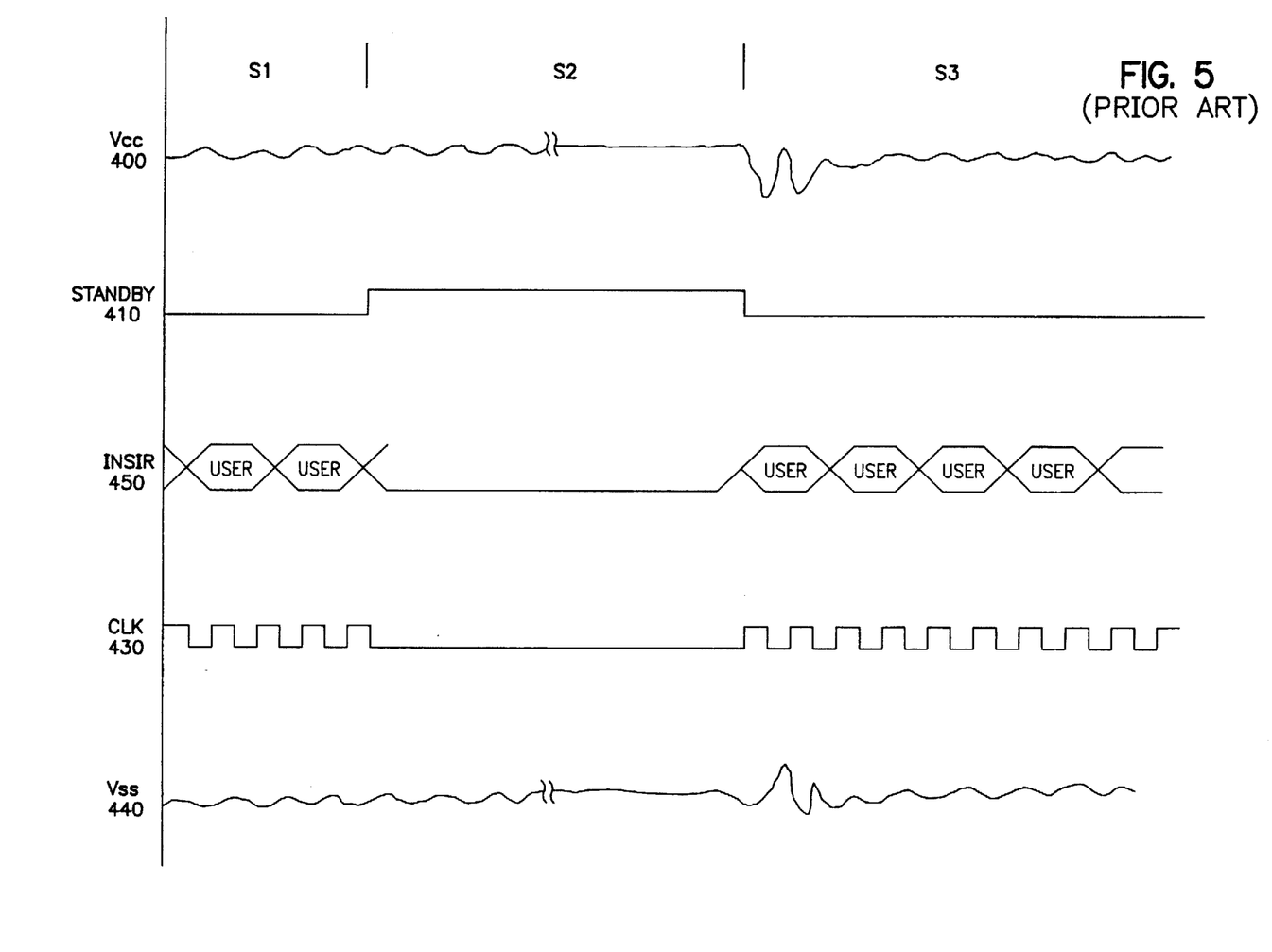
FIG. 5 is a wave form diagram of a prior art emergence of a processor from a reduced power state.

FIG. 5 is a waveform diagram illustrating the operation of the processor 101 emerging from the reduced power consumption state in the prior art. Referring to FIG. 5, the operation of the processor 101 in state S1 is the same as described in FIG. 4 above.

At state S3, when the processor 101 enters the reduced power consumption state, all the processor's parts are powered down without saving the processor's 101 state of operation prior to entering the reduced power consumption state. The instructions in the processor's instruction pipeline are not intercepted and stored as implemented in the currently preferred embodiment.

At state S3, when the processor 101 exits the reduced power consumption state, the processor 101 continues to execute instructions in its instruction pipeline prior to entering the reduced power consumption state.

Since the $V_{cc}$ 400 droops down and the $V_{ss}$ 440 spikes up as the processor 101 emerges from the reduced power consumption state in state S3, the user instructions being executed experience distortions (e.g., cause instructions to execute out of sequence) and possible failures due the voltage excursions in the processor 101.

The performance of prior art processors is thus substantially affected by the voltage excursions in the processor as the processor emerges from the reduced power consumption state.

Figure 6:
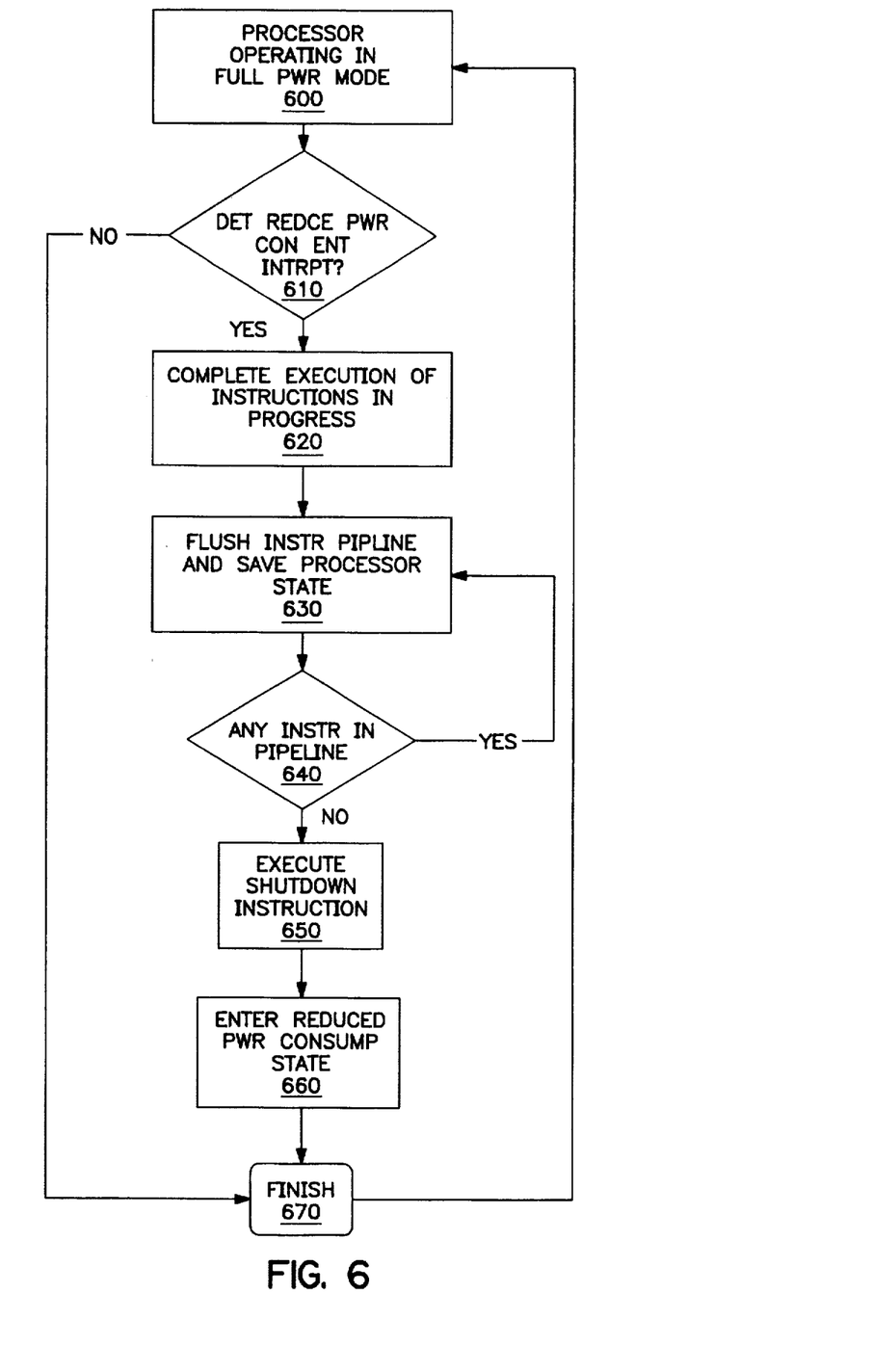
FIG. 6 is a flow chart of the shutdown routine of the preferred embodiment of the present invention.

FIG. 6 is a flow chart illustrating the execution of the shutdown instruction of the preferred embodiment of the present invention.

Referring to FIG. 6, the method of placing the processor 101 in a reduced power consumption state begins at processing block 600. At processing block 610, if the processor 101 detects a system interrupt (SMM interrupt) requesting the processor 101 to enter the reduced power consumption state, processing continues at processing block 620; otherwise, processing continues at processing block 670 where the processor 101 continues to operate in normal mode.

At processing block 620, when the processor 101 detects a system request for the processor 101 to enter the reduced power consumption state, the processor 101 completes executing any present instructions. Processing then continues at processing block 630.

At processing block 630, after the processing has completed executing any present instruction, the processor's instruction pipeline is flushed and the contents saved in the processor's instruction unit. The method of the present invention then proceeds to processing block 640.

At processing block 640, if the processor 101 instruction pipelines are flushed of all instructions, processing continues at processing block 650; otherwise, processing continues at processing block 630.

At processing block 650, the processor 101 begins to execute the shutdown instruction as the processor 101 enters the reduced power consumption state. The execution of the shutdown instruction enables the processor 101 to enter the reduced power consumption state gracefully without causing a sudden drop in current levels in the processor. By executing the shutdown instruction, the processor 101 gradually reduces its current consumption until the processor 101 is completely placed in the reduced power consumption state at processing block 660.

At processing block 660, the processor 101 enters the reduced power consumption state after it has completed executing the shutdown instruction. The method of executing the shutdown instruction of the present invention ends at processing block 670 when the processor 101 is in a reduced power consumption state.

Figure 7:
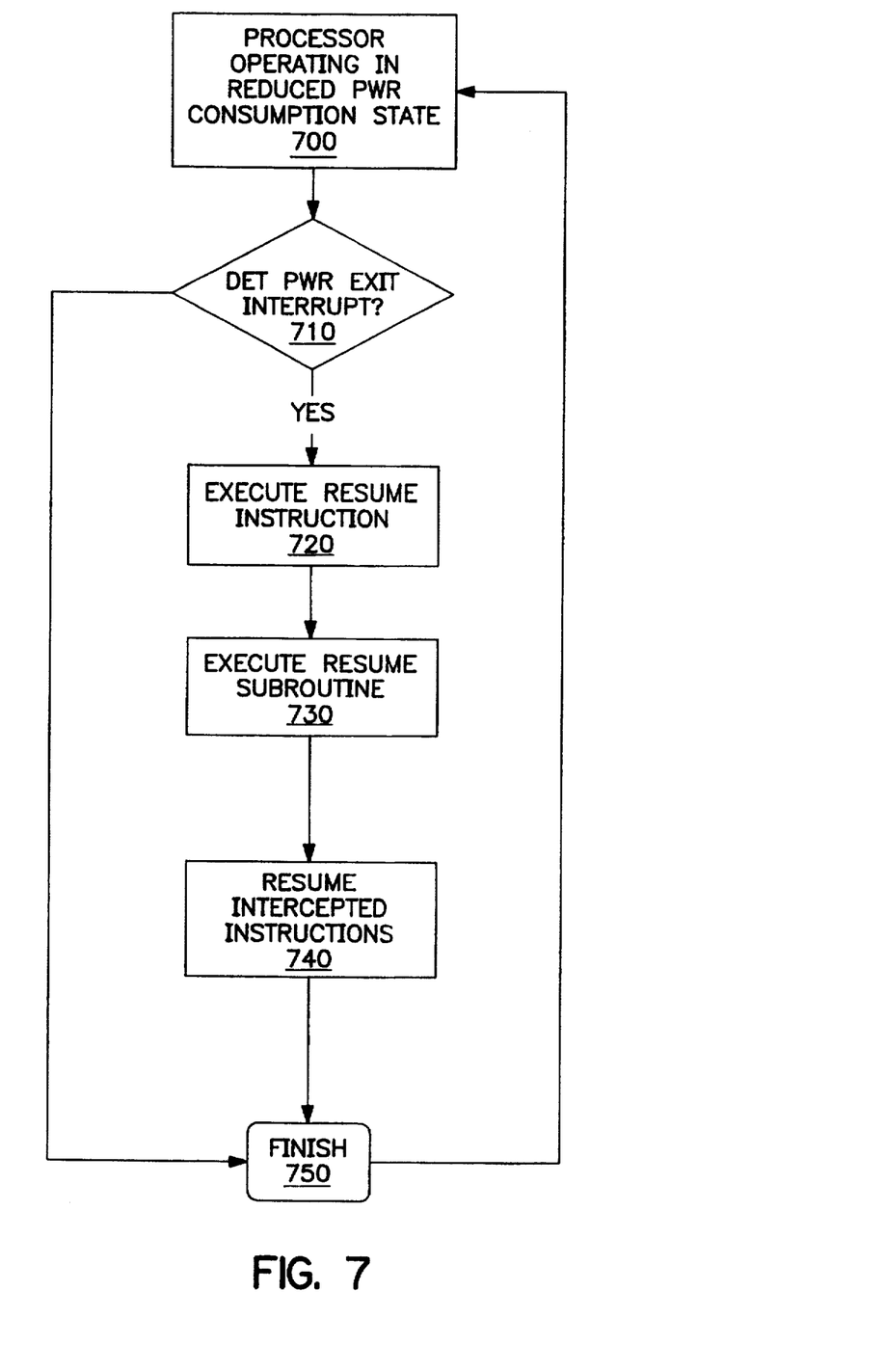
FIG. 7 is a flow chart of the resume routine of the preferred embodiment of the present invention.

FIG. 7 is a flow chart illustrating the resume phase of the preferred embodiment of the present invention. The resume phase begins at processing block 700 with the processor 101 in the reduced power consumption state. The processor 101 waits to detect a system request for the processor 101 to exit the reduced power consumption state at processing block 710. If the processor 101 does not detect a request to exit the reduced power consumption state, processing continues at processing block 750 where the processor 101 continues to remain in the reduced power consumption state.

At processing block 720, the processor 101 upon detecting the system request to exit the reduced power consumption state, begins to execute the resume instruction. Processing then continues at processing block 730 as the processor 101 continues to emerge from the reduced power consumption state.

At processing block 730, if the current level in the processor 101 is at normal level, processing continues at processing block 740; otherwise, processing continues at processing block 720. In the current preferred embodiment, it takes about two clock cycles for the current levels in the processor 101 to return full power levels.

At processing block 740, after the current levels in the processor 101 has returned to normal and there are no voltage fluctuations in the processor 101, the instructions intercepted before the processor 101 enter the reduced power consumption state are restored to the processor 101 which continues to execute the instructions from the same state prior to the processor 101 entering the reduced power consumption state, thus making the transition from the entry to the exit out of the reduced power consumption state transparent to the computer user.

The resume phase of the present invention ends at processing block 750 after the processor 101 returns to normal operating mode.

Although the present invention has been described herein with reference to a specific preferred embodiment, many modifications and variations therein will readily occur to those skilled in the art. Accordingly, all such variations and modifications are included within the intended scope of the present invention as defined by the following claims.

Thus, a method and apparatus for enabling a microprocessor enter and exit a reduced power consumption state without affecting the integrity of instructions being executed by the processor prior to entering the reduced power consumption state has been described.

We claim:

1. A method for enabling a microprocessor to enter and exit a reduced power consumption state without degradation to instructions being executed by said microprocessor prior to entering said reduced power consumption state, said method comprising the steps of:

a) detecting a first System Management Mode interrupt request for said microprocessor to enter said reduced power consumption state;

b) asserting a first signal upon detecting said first System Management Mode interrupt, wherein said signal causes said microprocessor to complete executing instructions pending in said microprocessor;

c) intercepting instructions in said microprocessor's instruction pipeline prior to said microprocessor entering said reduced power consumption state;

d) storing said intercepted instructions in said microprocessor;

e) flushing said instruction pipeline, so that instructions pending in said instruction pipeline are not executed as said microprocessor enters said reduced power consumption state;

f) executing a shutdown instruction in said microprocessor, such that said microprocessor enters said reduced power consumption state, wherein said execution of said shutdown instruction causes current levels in said microprocessor to be gradually reduced as said microprocessor enters said reduced power consumption state;

g) executing a resume instruction in said microprocessor as microprocessor exits said reduced power consumption state; and h) restoring said intercepted instructions to said microprocessor upon said microprocessor exiting said reduced power consumption state.

2. The method of claim I wherein said step (h) includes the step of restoring said intercepted instructions, so that said microprocessor is restored back to a state said microprocessor was in prior to entering said reduced power consumption state.

3. The method of claim I wherein said step (g) includes the step of detecting a second System Management Mode interrupt for said microprocessor to exit said reduced power consumption state.

4. The method of claim 1 wherein said step (g) further includes the step of waiting out voltage fluctuation in said microprocessor as said microprocessor exits said reduced power consumption state.

5. The method of claim 4 wherein said step of waiting out said voltage fluctuations in said microprocessor upon said microprocessor exiting said reduced power consumption state consumes at least two clock cycles.

6. The method of claim 1 wherein said step (e) includes the steps of:

entering a standby mode upon completion of said instruction intercepting step; and waiting for a second System Management Mode interrupt upon entering said reduced power consumption state.

7. In a computer system having a processing means coupled to peripheral devices, said processing means executing instructions to said peripherals devices, wherein said processing means enters and exits a reduced power consumption state, said computer system comprising:

a shutdown means responsive to a first System Management Mode interrupt for transitioning said processing means to a reduced power consumption state, said shutdown means including shutdown routines which cause current levels in the processing means to be gradually reduced as the processing means enters the reduce power consumption state, said shutdown means coupled to said processing means;

an intercepting means for intercepting instructions being executed in said processing means prior to said processing means entering said reduced power consumption state, said intercepting means coupled to said shutdown means;

a storing means coupled to said shutdown means for storing said intercepted instructions in said processing means, so that said instructions are not executed in said processing means while said processing means is in said reduced power consumption state;

exiting means responsive to a second System Management Mode interrupt for exiting said reduced power consumption state, said exit means includes exit routines which are executed by said processing means when exiting said reduced power consumption state, said exiting means coupled to said processing means; and a restoring means coupled to said exiting means for restoring instructions intercepted in said processing means prior to said processing means entering said reduced power consumption state.

8. The computer system of claim 7 further including a signal asserting means for asserting a first signal upon said processing means detecting said first System Management Mode interrupt, wherein said processing means begins to enter said reduced power consumption state upon the assertion of said first signal.

9. The computer system of claim 7 further comprising a flushing means for flushing instructions in said processing means instruction pipeline, so that user instructions in said processing means are not executed as a processing means enters said reduced power consumption state.

10. The computer system of claim 7 wherein said exiting means includes the execution of a resume instruction, said resume instruction including resume routines which are executed by said processing means through a wait out period to wait out voltage fluctuation in said processing means as said processing means exits said reduced power consumption state.

11. The computer system of claim 10 wherein said voltage fluctuation wait out period in said processing means consumes at least two clock cycles.

12. The computer system of claim 7 wherein said storing means further includes means for restoring said intercepted instructions in said processing means, so that said processing means begins executing user instructions from a same point said processing means was executing prior to said processing means entering said reduced power consumption state.

13. An apparatus for enabling a microprocessor to enter and exit a reduced power consumption state in a computer system without degradation in instructions being executed by said microprocessor prior to said microprocessor entering said reduced power consumption state, said apparatus comprising:

a shutdown circuit coupled to said microprocessor, said shutdown circuit activated by a first signal upon said microprocessor detecting a first System Management Mode interrupt, wherein said shutdown circuit includes shutdown routine executed by said microprocessor and causing current levels in the microprocessor to be gradually reduced as said microprocessor enters said reduced power consumption state;

a resume circuit coupled to said microprocessor, wherein said resume circuit includes resume routines executed by said microprocessor upon said microprocessor detecting a second System Management Mode interrupt to exit said reduced power consumption state; wherein said microprocessor deasserts said first signal upon detecting said second System Management Mode interrupt to exit said reduced power consumption state; and wherein instructions in an instruction pipeline in said microprocessor are intercepted and stored prior to said microprocessor entering said reduced power consumption state.

14. The apparatus of claim 13 wherein said intercepted instructions are restored in said microprocessor upon said microprocessor exiting said reduced power consumption state.

15. The apparatus of claim 13 wherein said resume routines are executed in said microprocessor to wait out voltage fluctuations in said microprocessor as said microprocessor exits said reduced power consumption state, wherein said wait out period consumes at least two clock cycles.

16. The apparatus of claim 13 wherein said shutdown circuit and resume circuit are coupled to microcode in said processor.

17. The apparatus of claim 13 wherein said shutdown circuit and said resume circuit are coupled to an operating system in said computer system.

18. The apparatus of claim 13 wherein said shutdown circuit and said resume circuit are coupled to a system BIOS in said computer system.

19. The apparatus of claim 13 wherein said instruction pipeline in said microprocessor is flushed of said instructions prior to said microprocessor activating said shutdown circuit.

20. The apparatus of claim 13 wherein said stored instructions in said microprocessor are restored in said microprocessor to place said microprocessor in the same state prior to said microprocessor entering said reduced power consumption state.

* * * * *

UNITED STATES PATENT AND TRADEMARK OFFICE
CERTIFICATE OF CORRECTION

| | | |
|---|---|---|
| PATENT NO. | : | 5,537,656 |
| DATED | : | July 16, 1996 |
| INVENTOR(S) | : | Mozdzen et al. |

It is certified that error appears in the above-identified patent and that said Letters Patent is hereby corrected as shown below:

In column 6, at line 1, delete "is".

In column 6, at lines 48-49, delete "with the 10.0 A that current in an order of magnitude up to processor 101" and substitute --with current in an order of magnitude up to 10.0 A that the processor 101--

In column 9, at line 36, delete "claim I" and substitute --claim 1--.

In column 9, at line 41, delete "claim I" and substitute --claim 1--

In column 10, at line 36 (the third line of claim 9), delete "said" and substitute --a--.

In column 10, at line 37 (the fourth line of claim 9), delete "a" and substitute --said--

Signed and Sealed this

Eighth Day of October, 1996

Attest:

BRUCE LEHMAN

*Attesting Officer*  *Commissioner of Patents and Trademarks*